United States Patent [19]
Heider

[11] Patent Number: 6,136,136
[45] Date of Patent: Oct. 24, 2000

[54] MOISTURE-CURABLE POLYURETHANE HOTMELT ADHESIVES WITH HIGH GREEN STRENGTH

[75] Inventor: Roland Heider, Oakbrook Terrace, Ill.

[73] Assignee: Henkel Corporation, Gulph Mills, Pa.

[21] Appl. No.: 07/982,203

[22] Filed: Nov. 25, 1992

[51] Int. Cl.$^7$ .................................................. C09J 101/00
[52] U.S. Cl. ...................... 156/331.4; 12/142 T; 36/19.5; 528/85
[58] Field of Search ........................ 156/331.4; 12/142 T; 36/19.5; 528/85

[56] References Cited

U.S. PATENT DOCUMENTS

| | | |
|---|---|---|
| 3,012,987 | 12/1961 | Ansul . |
| 3,094,495 | 6/1963 | Gemeinhardt . |
| 3,271,352 | 9/1966 | Weinberg . |
| 3,428,609 | 2/1969 | Chilvers et al. . |
| 3,509,232 | 4/1970 | Schoffenberger . |
| 3,514,427 | 5/1970 | Owens . |
| 3,691,117 | 9/1972 | Messerly . |
| 3,705,132 | 12/1972 | Coscurida . |
| 3,730,927 | 5/1973 | Schloss . |
| 3,829,533 | 8/1974 | Matsui et al. . |
| 4,321,173 | 3/1982 | Schuhmacher et al. . |
| 4,381,388 | 4/1983 | Naples . |
| 4,403,085 | 9/1983 | Christenson et al. . |
| 4,552,934 | 11/1985 | Rabito et al. . |
| 4,561,922 | 12/1985 | Peerman et al. . |
| 4,585,819 | 4/1986 | Reischle et al. . |
| 4,623,709 | 11/1986 | Bauriedel . |
| 4,624,996 | 11/1986 | Rizk et al. . |
| 4,667,661 | 5/1987 | Scholz et al. . |
| 4,737,566 | 4/1988 | Pedain et al. .............................. 528/85 |
| 4,756,785 | 7/1988 | König et al. .......................... 156/331.4 |
| 4,775,719 | 10/1988 | Markevka et al. . |
| 4,891,269 | 1/1990 | Markevka et al. . |
| 4,929,667 | 5/1990 | Ban et al. . |
| 4,957,959 | 9/1990 | Matsumoto et al. . |
| 4,999,407 | 3/1991 | Gilch et al. . |
| 5,039,573 | 8/1991 | Bravet et al. . |
| 5,070,114 | 12/1991 | Watts et al. . |
| 5,091,444 | 2/1992 | Bauer et al. . |
| 5,115,073 | 5/1992 | Meckel et al. . |
| 5,166,300 | 11/1992 | Rumon et al. ............................. 528/85 |
| 5,166,302 | 11/1992 | Werner et al. . |
| 5,173,538 | 12/1992 | Gilch et al. . |
| 5,190,607 | 3/1993 | Werner et al. . |

FOREIGN PATENT DOCUMENTS

| | | |
|---|---|---|
| 0107097 | 6/1984 | European Pat. Off. . |
| 0196749 | 10/1986 | European Pat. Off. . |
| 0246473 | 4/1987 | European Pat. Off. . |
| 0223562 | 5/1987 | European Pat. Off. . |
| 0244608 | 11/1987 | European Pat. Off. . |
| 0248658 | 12/1987 | European Pat. Off. . |
| 0369607 | 10/1989 | European Pat. Off. . |
| 0511566 | 11/1992 | European Pat. Off. . |
| 2609266 | 9/1976 | Germany . |
| 2626132 | 12/1977 | Germany . |
| 3502379 | 7/1986 | Germany . |
| 3613145 | 11/1986 | Germany . |
| 3524333 | 1/1987 | Germany . |
| 3717070 | 12/1988 | Germany . |
| 1385340 | 2/1975 | United Kingdom . |
| 2137638 | 10/1984 | United Kingdom . |

OTHER PUBLICATIONS

Ernest W. Flick, *Adhesive and Sealant Compounds and Their Formulations*, pp. 313–315, Noyes Data Corporation, Park Ridge, NJ, 1978.

George Woods, "An Introduction to Polyurethanes", *The ICI Polyurethanes Book*, pp. 1–12, Polyurethanes and John Wiley & Sons, New York, NY 1987.

George Woods, "Polyurethane Adhesives, Binders, Paints, lacquers, Cellular Coatings and Other Materials", *The ICI Polyurethanes Book*, pp. 197–203, Polyurethanes and John Wiley & Sons, New York, NY 1987.

"Urethane Polymers", *Encyclopedia of Chemical Technology*, vol. 23, pp. 576–607, John Wiley & Sons, New York, NY, 1983.

"Compatability", *Encyclopedia of Polymer Science & Engineering*, vol. 3, pp. 762–765, John Wiley & Sons, New York, NY, 1985.

Ryong, –Joon Roe, "Glass Transition", *Encyclopedia of Polymer Science & Engineering*, vol. 7, pp. 531–544, John Wiley & Sons, New York, NY, 1987.

"Thermal Analysis", *Encyclopedia of Polymer Science & Engineering*, Supp. vol., pp. 702–708 ,ohn Wiley & Sons, New York, NY, 1989.

P. Wright & A.P.C. Cumming,"Thermoplastic Polyurethanes", *Solid Polyurethane Elastomers*, pp. 179–198, Gordon and Breach Science Publishers, New York,1969.

"Ethylene Oxide Polymers", *Encyclopedia of Chemical Technology*, vol. 18, pp. 616–637, John Wiley & Sons, New York, NY, 1982.

J.L. Work, Dynamic Mechanical Properties of Urea–Ureathane Block Polymers, *Polymer Science and Technology*, vol. 4, Plenum.

"Thermal Degradation", *Encyclopedia of Polymer Science & Engineering*, vol. 4, pp. 686, John Wiley & Sons, New York, NY, 1986.

*Primary Examiner*—John J. Gallagher
*Attorney, Agent, or Firm*—Wayne C. Jaeschke; Stephen D. Harper; Daniel S. Ortiz

[57] ABSTRACT

A moisture-curable polyurethane hotmelt adhesive composition having high green peel strength and good creep resistance is formed from a polyester, low molecular weight polypropylene glycol and a diisocyanate, and optionally a tackifier. A method of bonding a sole to a shoe upper using the adhesive composition is also described.

20 Claims, No Drawings

MOISTURE-CURABLE POLYURETHANE HOTMELT ADHESIVES WITH HIGH GREEN STRENGTH

BACKGROUND OF THE INVENTION

1. Field of the Invention

This invention relates to a moisture-curable hotmelt adhesive, and more particularly, to a moisture-curable polyurethane hotmelt adhesive having high green peel strength and good creep resistance.

In the field of adhesives, it is a main concern to avoid environmental pollution, fire and toxicity hazards associated with the use of adhesives such as, for example, hot-melt adhesives for bonding of various materials. Hot-melt adhesives are attractive from the viewpoint of speed of set up and ease of application. Hot-melt adhesives are widely used in the shoe industry.

However, adequate adhesive bonds are generally not provided when employing certain substrate materials commonly employed in the shoe industry using common hot-melt adhesives. One important requirement in providing satisfactory adhesive bonds is that the adhesive composition applied must have sufficient fluidity to enable it to adequately wet the substrate to which it is applied. In addition, the composition should also effect at least some penetration of fibrous substrates. Further, it is also important that the composition develops a tough, solid bond. The aforementioned requirements are particularly important in adhesively bonding shoe soles to shoe uppers where the finished product is subjected to variations in stress under different conditions of use.

Moreover, commonly known adhesives are solvent-based and create environmental, fire and toxicity hazards. Thus, a solvent-free adhesive which avoids such hazards, is easy to apply and cures to form strong bonds to a variety of substrates, for example, as in the manufacture of shoes, in an economically acceptable time, is commercially very desirable. Indeed, for many years it has been desirable to provide an adhesive applicable as a hot-melt without risk of such hazards and which cures to provide strong sole attaching bonds on a variety of substrates.

However, it has been found that a main drawback of hot-melt adhesives is their poor green peel strength. Even with the wide range of polyester materials that are commercially available, it has not previously been possible to increase the green peel strength of such adhesives without raising their viscosity to undesirable levels or lowering their cold temperature flexibility.

2. Discussion of Related Art

In the prior art there are described and claimed various methods of adhesively bonding a shoe sole to a shoe upper using selected urethane prepolymer compositions which are provided as fluid compositions and which are convertible by a chain extension treatment to a polyurethane which is tacky and capable of adhesive union when heated and so to establish substantially immediate strong adhesive union with a compatible adhesive or resin surface. The chain extension is preferably done at higher temperatures under humid conditions, e.g. in a steam cabinet or alternatively at room temperatures and relative humidities of 20 to 60%. Such methods have the advantage of employing a substantially solvent-free adhesive composition applied at a comparatively low temperature, but a significant disadvantage accompanying use of the adhesive compositions is the considerable time needed for chain extension of the prepolymer after application. The uppers which are cemented with the prepolymer have to be cured for significantly long periods of time at comparatively high temperature and comparatively high humidity in order to give required chain extension sufficient to obtain a bond of acceptable initial strength.

Attempts to improve the speed of chain extension, for example, by appropriate selection of raw materials have met with some success, but the practical requirements for tolerance of chain extension conditions and of delays prior to heat activation conditions used in a shoe factory, together with the need for producing strong bonds to a variety of substrates pose a significant problem.

One attempt to overcome said problems is disclosed in Germany Patent 26 09 226 equivalent to Great Britain 1,540,634 and Canada 1,077,352 which is directed to a process for adhesive bonding of surfaces by applying a polymeric urethane containing reactive NCO groups and segments having a comparatively low crystalline melting point to the surface of an article, and contacting the urethane with a compound supplying active hydrogen atoms which react with the NCO groups to cause a chain extension therein.

Another adhesive composition is disclosed in Great Britain 2, 137,638 wherein a moisture-curable adhesive comprises polyurethane prepolymers having NCO groups available for reaction, and a monofunctional reactant present in amounts sufficient to react with up to 40 mole percent of the isocyanate groups of the prepolymer. The polyurethanes are preferably based on polyesters from aliphatic dicarboxylic acids and diols together with aromatic diisocyanates. The monofunctional reactant is preferably an aliphatic primary alcohol and is said to influence the extended ability of a chain extended layer of the adhesive to be activated by heat after comparatively long periods and provide good bond strengths.

A further method of bonding a sole to a shoe is disclosed in European Patent Specification 223,562 by applying a moisture-curable, solvent-free melt adhesive to the sole and/or shoe upper, subjecting the adhesive coating to a hot-cure step with airborne moisture, and pressing the sole and shoe upper together with the adhesive between them immediately after the hot-cure step, preferably in less than 90 seconds after leaving the hot-cure.

However, the prior art methods and adhesive compositions suffer from numerous disadvantages. That is, characteristics desirable for an adhesive composition for application in at least substantially solvent-free form for sole attaching purposes include the following properties. The adhesive composition should be capable of application in fluid form at a temperature which is sufficiently low that the shoe making materials used are not adversely affected. The adhesive composition should have at such temperatures good heat resistance, viscosity and flow characteristics which enable it to properly wet surfaces to which it is applied and preferably also to penetrate fibrous materials, for example, leather, whereby to establish good initial adhesive bonds to the materials. Coatings of the adhesive present on the materials should have good creep resistance, and harden adequately within a few minutes to provide at least a non-tacky surface and preferably a solid form-retaining non-tacky coating on the material to the extent that soles and shoe uppers coated with the adhesive composition may be handled and stored when cooled without sticking together and without significantly disturbing the applied layers of adhesive composition. It is also desirable that the adhesive union achieved between the sole and shoe upper should initially be sufficiently strong to avoid springing of the sole edges from the shoe upper during handling and storage immediately after sole pressing, i.e., have good green peel strength, and should be or become adequately cured to withstand normal conditions of use of the shoe as epitomized by ability to withstand a peel test at 5 kg per cm width carried out 72 hours after sole pressing.

In addition, when using an adhesive composition comprising a moisture curable polyurethane hot-melt prepolymer, it is desirable that coatings of the adhesive composition on the shoe quickly cure a short time after application to bring about conversion of the prepolymer to a tough, solid condition.

Further, when using an adhesive composition comprising a moisture curable polyurethane hot-melt prepolymer, it is desirable that coatings of the adhesive composition on the shoe should be susceptible to the effect of moisture in the atmosphere under normal, ambient conditions of storage of the soles, i.e. approximately 20°+/−5° C. and relative humidity of not less than approximately 10% to bring about conversion of the prepolymer to a tough, solid, cured condition. It is convenient if this condition is at least partially achieved during storage overnight, and it is highly desirable that the conversion of the prepolymer of an adhesive composition coating on the shoe progresses during storage in such a way that the coating becomes fully cured in a period of up to about three days after application.

In addition, the cured adhesive composition should have good flexibility at low temperatures, and provide a strong bond to a variety of materials, for example, as employed in the shoe industry.

DESCRIPTION OF THE INVENTION

Other than in the operating examples, or where otherwise indicated, all numbers expressing quantities of ingredients or reaction conditions used herein are to be understood as modified in all instances by the term "about".

The term "shoe" where used herein relates to outer footwear generally and includes the article in the course of manufacture. The term "sole" where used herein relates to shoe tread members generally and includes heels and sole and heel units.

The instant invention provides an improved moisture-curable polyurethane solvent-free, hot-melt adhesive composition having good creep resistance, high green peel strength and mature bond strength which is particularly useful in attaching soles to shoes or shoe uppers. The adhesive composition is initially sufficiently fluid at relatively low temperatures as to enable wetting adhesive engagement with a surface to be bonded and is curable either at room temperature or at slightly elevated temperature to a solid, non-tacky condition in which it is capable of establishing substantially immediate strong adhesive union with a shoe surface and which can be used to provide acceptable sole attaching bonds without undue delay in shoe manufacture and without the need for a chain extension step as in the prior art.

In general terms, the invention provides an adhesive composition capable of application to a workpiece in a solvent-free, heat-softened condition to provide a layer which cures to form a strong adhesive bond. The composition comprises a moisture-curable polyurethane hot-melt adhesive formed from a polyester, low molecular weight polypropylene glycol, and a diisocyanate, and optionally, an aromatic modified hydrocarbon resin or terpene hydrocarbon resin. The polyester is present in the adhesive composition in an amount of from about 20%/wt to about 65%/wt, the polypropylene glycol is present in an amount of from about 10%/wt to about 70%/wt, and the diisocyanate is present in an amount of from about 15%/wt to about 35%/wt, based on the weight of the polyurethane adhesive composition. Preferably, the polyester is present in an amount of from about 35%/wt to about 50%/wt, the polypropylene glycol is present in an amount of from about 15%/wt to about 35%/wt and the diisocyanate is present in an amount of from about 15%/wt to about 35%/wt, based on the weight of the polyurethane adhesive composition because a high concentration of low molecular weight polypropylene glycol provides a high concentration of urethane groups which results in excellent green peel strength. Although not wishing to be bound by any theory, it is believed that the excellent green peel strength is the result of using low molecular weight polypropylene glycol which becomes linked with the diisocyanate to form longer chains which are isocyanate terminated and contain fully reacted diisocyanate. It is believed that the formation of hydrogen bonds between the short molecules simulates a higher molecular weight wherein at the application temperatures of 110° C. to 180° C. the hydrogen bonds are so weak that the viscosity of the adhesive is not undesirable high. However, after cooling to room temperature the bonds are so strong that they provide a very high level of green strength to the adhesive. It is postulated that the reason for the high green peel strength of the adhesive composition is the likely tendency of phase separation between the polypropylene glycol soft segments and the hard segments of the diisocyanate, such as diphenylmethane 4,4'-diisocyanate, which together with the polyester material probably form an interpolymeric network. In addition it has been found possible to provide a satisfactory polyurethane hot-melt adhesive composition based only on polypropylene glycol and a diisocyanate; i.e., without a polyester material.

The average molecular weight of the polyurethane product after reaction should be from about 3,500 to about 10,000 to provide a low viscosity and a high green peel strength. In addition, the content of diisocyanate is relatively high in order to obtain a polyurethane product having a molecular weight in the afore-stated range of values. Accordingly, the theoretical molecular weight of the reaction product should not be too low because then its green strength is too low. It should also not be so high that its viscosity is too high. When an aromatic modified hydrocarbon resin or terpene hydrocarbon resin is present, it is present in an amount of from about 3%/wt to about 15%/wt, preferably from about 5%/wt to about 10%/wt, based on the weight of the polyurethane adhesive composition.

By virtue of the selection of the polyurethane ingredients and their proportionate amounts, it is possible to prepare a polyurethane of required characteristics capable of use in or for an adhesive composition particularly suitable for sole attaching in a convenient manner without exposing the shoe upper or sole to excessive conditions of temperature or humidity.

The selection of ingredients and proportionate amounts employed to prepare the polymer for the adhesive composition for sole attaching is significant in relation to ensuring the polyurethane has the necessary characteristics; for example, the capability for extrusion in heat softened condition onto a workpiece at temperatures in the range of 110° C. to 180° C., the capability at such temperatures to flow and properly wet customary shoemaking materials, and even to penetrate somewhat fibrous materials, the ability to provide when cooled a form-retaining, i.e., creep-resistant non-tacky layer on such materials, the capability for relative adjustment between the sole and shoe upper as the bond is being made, and the capability to provide adhesive bonds of acceptable strength.

The hot-melt adhesive composition of this invention does not require a precuring step because its green peel strength is high enough to attach and fix joined articles such as a sole and shoe upper after pressing and to overcome memory forces. In one aspect of using the adhesive composition, the adhesive may be employed in a one-way application, i.e., the adhesive need be applied on only one of the surfaces to be joined, e.g., on the sole of a shoe or to the shoe upper. In this procedure, if the adhesive is applied to one of the surfaces, for example the sole, the sole is first pretreated, for example primed, it is then preheated such as in a preheater, the surface is coated with the adhesive, the sole and shoe upper are joined, and then pressed together. It is also possible to apply the adhesive to both of such surfaces. In such case, after preheating the coated surfaces and joining them, they are pressed together. Thus, the high green peel strength of the adhesive composition makes it possible to attach shoe soles to shoe uppers directly after application of the adhesive.

The polyester component from which the prepolymer of the adhesive composition according to the invention is formed may be at least partially crystalline or it may be amorphous, and is preferably a mixture of partially crystalline and amorphous polyesters. For example, when employing a partially crystalline polyester material having a high viscosity made from a mixture such as isophthalic acid, butanediol, phthalic acid dimethylester and adipic acid, the adhesive product obtained has a high green peel strength. When a polyester material having a lower glass transition temperature such as a mixture of phthalic acid dimethylester, adipic acid and hexanediol is present in the adhesive composition such provides improved cold temperature flexibility. The criteria for cold temperature flexibility in the shoe industry is 100,000 flexes at −20° C. In order to increase and improve the creep resistance of the adhesive, an amorphous polyester and hydrocarbon resin are added to the composition. However, the amount of amorphous polyester and hydrocarbon resin should be controlled because these materials increase the glass transition temperature of the composition. Suitable partially crystalline polyesters include the hydroxyl terminated polyesters of aliphatic hydroxy acids and their lactones and the more preferred hydroxyl polyester of 6 to 12 carbon atom linear aliphatic dicarboxylic acids, for example, adipic, azelaic and sebacic acids with, preferably even numbered, glycols having from 4 to 8 carbon atom chains, for example, 1,4-butane diol and 1,6-hexane diol. The acid component of the polyester polyol may include up to 25% on a molar basis of other acids or their ester forming derivatives, for example, cyclohexane dicarboxylic acids, terephthalic acid and isophthalic acid. The glycol component may include up to 15% on a molar basis of other diols, for example, diethylene glycol and 1,4-cyclohexane dimethanol. The polyesters preferably have a molecular weight in the range from 1,500 to 6,000 and preferably from 2,500 to 4,500, and preferably have a crystalline melting point in the range from 40° to 70° C., more preferably 45° C. to 65° C. The term "crystalline melting point", where used herein indicates the temperature at which crystalline segments of the material melt, and is determined as the temperature of the major endotherm peak in a differential thermal analysis. When the polymer is brought above its crystalline melting point in application, the crystalline segments melt and cause softening of the polymer. The molecular weight of the polyester is of significance in that increasing molecular weight of the polyester tends to lead to the resulting polyurethane becoming progressively more difficult to extrude as a hot melt at acceptable temperatures, whereas decreasing molecular weight of the polyester tends to lead to polyurethanes which are not sufficiently solid at room temperature. Preferably a poly(butane diol adipate) of molecular weight about 3,500 and crystalline melting point of about 50° C. is used as a partially crystalline polyester. Suitable polyester materials for use herein include those having a hydroxyl number of from about 27 to about 60; a glass transition temperature of from about −40° C. to about +30° C., and a viscosity at 130° C. of from about 3,000 to about 30,000 mPas.

The diisocyanate component from which the prepolymer of the adhesive composition according to the invention is formed is preferably aromatic, and may be selected, for example, from toluene diisocyanates, diphenyl methane diisocyanates, and mixtures thereof. Pure 4,4' diphenyl methane diisocyanate is a most preferred aromatic diisocyanate, but other materials, for example, a mixture of 4,4'- and 2,4'-isomers of diphenyl methane diisocyanate may be used which may yield advantages in relation to tack retention and spotting tack such as when the polyester comprises poly(hexane diol adipate). It is important that the diisocyanate be at least substantially difunctional in order to facilitate production of polyurethane capable of satisfactory heat activation and final curing properties. Trifunctional isocyanate contents of more than 10% by weight of the diisocyanate should be avoided.

The ratio of NCO:OH groups is selected to provide a product having a molecular weight which is high enough to result in a good green peel strength, and a viscosity which is low enough for application and production. Thus, the urethane prepolymer should have a ratio of reactive NCO groups to reactive OH groups of from about 1.1:1 to about 1.7:1, preferably of from about 1.2:1 to about 1.5:1. However, an NCO:OH ratio of up to about 2:1 is possible by using high molecular weight polyesters.

The polypropylene glycol component is an important component of the formulation, and several advantages are obtained from its presence in the composition according to the invention. In particular, its presence in the prepolymer chain in the amounts described has been found to result in exceptionally high green peel strength (strength before curing) of the adhesive composition and a high creep resistance which is necessary for the sole attachment step. Thus, a high green peel strength is obtained using a relatively high amount of diol having a relatively low molecular weight, for example, about 400 to 500, and wherein the diol is in the prepolymer chain between diisocyanate groups. The relatively short soft diol chains provide good flow properties to the prepolymer at application temperatures, and the diisocyanate provides a high bonding strength due to the hydrogen bonds between the urethane groups. In this regard, it may also be possible to use a polyester or polytetrahydrofuran as a soft segment.

The polypropylene glycol component may have a molecular weight between about 250 and about 1,000, preferably between about 400 and about 500. Excellent results have been obtained with polypropylene glycol having a molecular weight of about 425. However, polypropylene glycol mixtures containing higher or lower molecular weight components may also be used. The amount of such polypropylene glycol component present is from about 10%/wt to about 70%/wt, preferably from about 15%/wt to about 35%/wt, based on the polyurethane adhesive composition. In addition, it has been found that tetraethylene glycol when present in large amounts similar to that of the propylene glycol also provides a good green peel strength, and polybutylene glycol may be also suitable to increase the green peel strength of the adhesive composition.

The urethane prepolymer is prepared by dehydrating a mixture of polyester and the polypropylene glycol at a temperature of from about 110° C. to about 130° C. in a vacuum for about 60 minutes. After cooling the mixture to about 90° C., a diisocyanate, preferably diphenylmethane 4,4' diisocyanate, in an NCO:OH ratio of between about 1.1:1 to about 1.7:1, preferably about 1.2:1 to about 1.5:1, is reacted with the polyester and polypropylene glycol mixture at a temperature of from about 110° C. to about 130° C. in a vacuum for about 60 minutes to provide an NCO-terminated prepolymer useful as a solvent-free, hot-melt adhesive composition.

Although not usually necessary, an adhesive composition according to the invention may contain a catalyst to enhance the speed of the curing reaction. It is possible to include the catalyst in the prepolymer forming reaction. Suitable catalysts include the known polyurethane catalysts, for example, a diorgano tin compound such as dibutyl tin dilaurate or a mercapto tin compound. In general, amounts of catalyst from about 0.05% to about 1% by weight based on the weight of prepolymer may be used. Conveniently, the catalyst may be added to the reactants as a solution in a very small amount of plasticizer, i.e., less than 1% by weight of the composition.

In a composition according to the invention, it may be desirable to include materials such as fillers and tackifiers. Tackifiers effective to improve the establishment of adhesion include tackifiers of the hydrocarbon type such as the unsaturated hydrocarbons, terpenes, e.g., alpha and beta-pinene polymers, low molecular weight styrenes such as polyalphamethyl styrene, rosin esters and coumarone-indene resins. Also, inert fillers in general such as clays, carbonates, titanium dioxide and others may be included in the composition, but this is not preferred for sole attaching adhesives.

As described above, adhesive compositions according to the present invention have reactive NCO groups and are sensitive to air-borne moisture, and it is therefore necessary to prevent premature polymerization of the polyurethane during storage of the composition. To this end, the adhesive composition is stored under conditions as to exclude materials reactive with the polyurethane, for example in a sealed dry, at least substantially impervious, container.

The polyurethane is preferably solid at room temperature, has a comparatively low molecular weight and has crystalline segments in the polymer molecule having a relatively low crystalline melting point, and can be applied on a surface at a temperature in the range of 110° C. to 180° C., at which it is freely fluid for entering wetting adhesive engagement with the surface.

Preferred compositions according to the invention are particularly useful in attaching soles to shoe uppers by a method in which a layer of the adhesive composition is applied in heat softened condition to either of the sole or shoe upper or to both. They may also be used satisfactorily in other shoe making processes and indeed in bonding processes employed in other trades or industries.

The invention also provides in another of its aspects a method of bonding a sole to a shoe upper comprising the steps of providing on attaching surfaces of one or both of the sole and shoe upper a layer of the adhesive composition according to the invention, heating the layer or at least one of the layers of the adhesive composition to bring it to a softened, tacky adhesive condition, pressing the attaching surfaces of the sole and shoe upper together with the adhesive composition between them and bringing about cooling of the composition to form an adhesive bond between the sole and the shoe upper.

In a method according to the invention, the adhesive composition is applied in fluid form and preferably is applied in a solvent-free condition as a melt. Thus, the fluid composition has the fluidity needed for wetting adhesive engagement with the surface as a result of heating to a relatively low temperature, or the composition may comprise a solution of the polyurethane dissolved in an organic solvent which is removed for example by evaporation prior to the curing reaction.

In carrying out the method of sole attaching according to the invention, the adhesive composition is preferably applied in a fluid condition to a sole attaching surface on the bottom of a shoe upper or the attaching surface of an outsole by suitable applicator means or even by hand. Relatively low application temperatures, for example, temperatures of 110° C. to 180° C. have been found useful with the solvent-free polyurethanes according to the invention. It is desirable that the thickness of coatings of the adhesive composition be uniform. It is preferred that the adhesive coating be from about 1 to about 5 mils in thickness for most satisfactory results. Relatively thin coatings are effective on relatively smooth, i.e., regular surfaces such as the attaching surface of an outsole, and coatings as thin as 0.003" may be applied to more irregular surfaces such as the sole attaching surface on the bottom of a shoe upper.

In a method according to the invention, curing may be carried out under a variety of conditions. For example, using preferred compositions, satisfactory curing by exposure to airborne moisture can be achieved by exposure to a moisture saturated atmosphere, i.e. not less than 25% relative humidity at 20° C. for at least 24 hours, or preferably by exposure to ambient storage conditions, i.e. varying in the range 20° C. +/−5° C. and relative humidity of not less than 10% for a period of 3 to 7 days.

Prior to application of the layer or layers of adhesive composition, the sole and shoe upper may be subjected to a pretreatment for example as normally employed in the shoe making trade, e.g. roughing of shoe components, e.g., leather, solvent-wiping, or priming, e.g. halogenation of certain rubber components.

In order that the invention may become more clear, there now follows a description of adhesive composition examples and of an example method of sole attaching using such adhesive compositions, each of which compositions and method is according to the invention and illustrative thereof. It will, of course, be understood that the illustrative compositions and method have been selected for description to illustrate the invention by way of example only and not by way of limitation thereof.

In the following examples, the polyurethane adhesive compositions were prepared by dehydrating the specified amounts of polyester or polyester mixture and polypropylene glycol, and optionally the polymerized beta-pinene resin, at a temperature of from about 110° C. to about 130° C. in vacuum for about 60 minutes. After cooling to about 90° C., the mixture was reacted with the given amount of diphenyl methane 4,4'-diisocyanate (MDI) at a temperature of from about 110° C. to about 130° C. in vacuum for about 60 minutes. Following the reaction, the prepolymer was placed in a moisture-proof container and then evaluated for viscosity at various temperatures, for green peel strength, mature bond strength and creep resistance.

As shown in the examples, polyester A is a partially crystalline copolyester comprising a mixture of isophthalic acid, butanediol, phthalic acid dimethylester and adipic acid. Polyester A has a molecular weight of about 3500, a hydroxyl number of 27 to 34 as determined per DIN 53240, a glass transition temperature of about −20° C. as determined by DSC, and a viscosity at 100° C. of about 30,000 mPas and at 130° C. of about 5,000 mPas determined with a Brookfield viscosimeter (LVT4). Polyester B is a partially crystalline copolyester comprising a mixture of phthalic acid dimethylester, adipic acid and hexanediol. It has a molecular weight of about 3500, a hydroxyl number of 27–34 as determined per DIN 53240, a glass transition temperature of about −40° C. as determined by DSC, and a viscosity at 130° C. of about 3,000 mPas determined with a Brookfield viscosimeter (LVT4). Polyester C is a solid, amorphous copolyester comprising a mixture of isophthalic acid, neopentyl glycol, ethylene glycol, adipic acid, phthalic acid, and 3-hydroxy-2,2-dimethylpropyl-3-hydroxy-2,2-dimethyl propanoate. It has a molecular weight of about 3500, a hydroxyl number of 31–39 as determined per DIN 53240, a glass transition temperature of about +30° C. as determined by DSC, and a viscosity at 130° C. of about 30,000 mPas determined with a Brookfield viscosimeter (LVT4). Polyester D is a solid, amorphous copolyester comprising a mixture of neopentyl glycol, ethylene glycol, adipic acid and phthalic acid anhydride. It has a molecular weight of about 2000, a hydroxyl number of 50–60 as determined per DIN 53240, a glass transition temperature of about +10° C. as determined by DSC, and a viscosity at 80° C. of about 70,000 mPas and at 130° C. of about 5,000 mPas determined with a Brookfield viscosimeter (LVT4). Polyester E is a high viscosity copolyester having a molecular weight of about 3500, a hydroxyl number of 27–34 as determined per DIN 53240, a glass transition temperature of about −20° C. as determined by DSC, and a viscosity at 80° C. of about 25,000 mPas determined with a Brookfield viscosimeter (LVT4).

Polyester F is a high viscosity copolyester having a molecular weight of about 3500, a hydroxyl number of 27–34 as determined per DIN 53240, a glass transition temperature of about −30° C. as determined by DSC, and a viscosity at 80° C. of about 10,000 mPas determined with a Brookfield viscosimeter (LVT 4). Polyester G is a very weakly crystalline, saturated, linear copolyester having a viscosity number of 77–83 cm$^3$/g as determined per DIN 53728, a softening point of 99–105° C. as determined per DIN 52011, a glass transition temperature of about −23° C. as determined by DSC, and a melt viscosity at 180° C. of 53–62 Pas and at 200° C. of 30–37 Pas as determined with a rotating viscosimeter (plate/cone). Polyester H is a weakly crystalline, saturated, linear copolyester having a viscosity number of 77–83 cm$^3$/g as determined per DIN 53728, a softening point of 102–110° C. as determined per DIN 52011, a glass transition temperature of about −12° C. as determined by DSC, and a melt viscosity at 180° C. of 65–75 Pas and at 200° C. of 35–40 Pas as determined with a rotating viscosimeter (plate/cone). Polyester I is a solid, amorphous copolyester having a molecular weight of about 3500, a hydroxyl number of 27–34 as determined per DIN 53240, a glass transition temperature of about 20° C. as determined by DSC, and a viscosity at 130° C. of about 7,000 mPas determined with a Brookfield viscosimeter (LVT 4). The polyester materials are commercially available from Hüls AG, Troisdorf, Germany.

The polypropylene glycol had a molecular weight of about 425, and is available from Miles Inc., Pittsburgh, Pa. The tackifier is a polymerized betapinene resin available from Hercules Inc., Wilmington, Del. The hydrocarbon resin is available from Arizona Chemical Co., Panama City, Fla. and serves as a tackifier and to increase creep resistance. The diphenylmethane 4,4'-diisocyanate (MDI) is available from Miles Inc., Pittsburgh, Pa.

For the test results, viscosity was measured using a Brookfield Thermocell viscosimeter by heating a tube of the polyurethane hot-melt for 15 minutes at the various temperatures shown in the examples before taking the value. The measurement over two hours is made to evaluate the melt stability of the polyurethane hot-melt by measuring the increase in viscosity during this time, mostly at 130° C. The peel strength values shown in the examples were obtained by first preparing test samples wherein SBR (styrene-butadiene rubber) was cut into 1 inch wide strips of about 4 to 5 inches long. The strips were dipped in a primer solution for about 5 seconds, and then dried for about 30 minutes at 100° C. in an oven. The shoe upper material was either leather or man-made polyurethane-coated fabric which was conventionally roughened. In one aspect, adhesive was applied in about a 0.5 mm layer on the heated and primed SBR sample. The heated shoe upper material was pressed onto the SBR sample first by hand, then in a press at a pressure of 100–200 psi for about one minute. In a second aspect, adhesive was applied on both preheated surfaces, pressed together by hand, then in a press at a pressure of 100–200 psi for about one minute. After the time periods shown in the examples, the samples were evaluated for peel strength by placing them in an Instron tensile machine and peeling them apart at a speed of 0.5 inch/minute and also at 5.0 inches/minute. The creep resistance values shown in the examples were obtained by attaching a weight of 500 grams to the uncemented portion of the upper shoe material of the samples used in the peel strength test. Creep resistance is measured in mm/hour. After curing of the adhesive, this test was conducted at different temperatures to also evaluate the heat resistance of the adhesive.

EXAMPLES

|  | 1 | 2 | 3 | 4 |
| --- | --- | --- | --- | --- |
| Polyester A | 31.4% | 47.6% | 46.2% | 35.5% |
| Polyester B | 20.9% | — | — | — |
| Polypropylene gylcol | 20.9% | 23.8% | 28.9% | 35.5% |
| Tackifier | 6.3% | 6.3% | — | — |
| MDI | 20.5% | 22.3% | 24.9% | 29.0% |
| NCO:OH | 1.3 | 1.3 | 1.25 | 1.25 |
| Viscosity [Pas] |  |  |  |  |
| 90° C. | — | — | — | — |
| 110° C. | — | — | — | — |
| 130° C. | 60 | 54 | 97 | 35 |
| 150° C. | 30 | 28 | 61 | 20 |

-continued

| | 1 | 2 | 3 | 4 |
|---|---|---|---|---|
| 170° C. | 20 | 18 | — | — |
| Peel strength* (SBR/Man made) [pli] | | | | |
| after 5 min | 2.8–3.3 | 9–11 | 25–28 | 13–20 |
| after 3 days | 30–35 | 20–25 | — | |

*at speed of 0.5 inch/minute

Examples

| | 5 | 6 | 7 |
|---|---|---|---|
| Polyester A | 32.4% | 34.6% | 23.0% |
| Polyester B | — | — | 11.5% |
| Polypropylene glycol | 32.4% | 34.6% | 34.5% |
| Tackifier | 6.5% | — | — |
| MDI | 28.7% | 30.8% | 31.0% |
| NCO:OH | 1.35 | 1.36 | 1.37 |
| Viscosity [Pas] | | | |
| 90° C. | 200 | 144 | 106 |
| 110° C. | 55 | 34 | 52 |
| 130° C. | 21 | — | 12 |
| 150° C. | — | — | — |
| 170° C. | — | — | — |
| Peel strength* (SBR/Man made) [pli] | | | |
| after 5 min | 5–6 | 3–5 | 1–3 |
| after 3 days | 21–27 | 25–30 | 22–30 |

*at speed of 0.5 inch/minute

Examples

| | 8 | 9 | 10 | 11 | 12 |
|---|---|---|---|---|---|
| Polyester A | 47.6% | 24.8% | 16.5% | 14.1% | 23.3% |
| Polyester B | — | — | 16.5% | 14.1% | 11.7% |
| Polyester C | — | 24.8% | 16.5% | 28.3% | 5.8% |
| Polyester D | — | — | — | — | 5.8% |
| Polypropylene glycol | 23.8% | 24.8% | 24.5% | 17.7% | 23.3% |
| Tackifier | 4.8% | — | — | — | 5.8% |
| Hydrocarbon resin | — | — | — | 5.3% | — |
| MDI | 23.8% | 25.6% | 26.0% | 20.5% | 24.3% |
| NCO:OH | 1.4 | 1.4 | 1.4 | 1.4 | 1.4 |
| Viscosity [Pas] | | | | | |
| 90° C. | 190 | 375 | 310 | 98 | — |
| 110° C. | 55 | 130 | 75 | 60 | — |
| 130° C. | 22 | 52 | 26 | — | 26 |
| 150° C. | — | — | — | — | — |
| 170° C. | — | — | — | — | — |
| Peel strength* (SBR/Man made) [pli] | | | | | |
| after 5 min | 2.5–5 | 23–28 | 10–14 | 25–28 | 12 |
| after 3 days | 28–32 | — | — | — | — |
| Creep resistance | — | — | — | — | good |
| Mature bond strength (leather/SBR) pli after 7 days | — | — | — | — | 30 |

*at speed of 0.5 inch/minute

Examples

| | 13 | 14 | 15 | 16 |
|---|---|---|---|---|
| Polyester A | 29.2% | 23.3% | 29.1% | 23.4% |
| Polyester B | 5.8% | 11.6% | 5.8% | 11.7% |
| Polyester C | 5.8% | 1.2% | 1.2% | 10.5% |
| Polyester D | 5.8% | 10.5% | 10.5% | 1.2% |
| Polypropylene glycol | 23.3% | 23.3% | 23.3% | 23.4% |
| Tackifier | 5.8% | 5.8% | 5.8% | 5.9% |
| Hydrocarbon resin | — | — | — | — |
| MDI | 24.3% | 24.3% | 24.3% | 23.9% |
| NCO:OH | 1.4 | 1.4 | 1.4 | 1.4 |
| Viscosity [Pas] | | | | |
| 90° C. | — | — | — | — |
| 110° C. | — | — | — | — |
| 130° C. | 43 | 22 | 24 | 27 |
| 150° C. | — | — | — | — |
| 170° C. | — | — | — | — |
| Peel strength* (SBR/Man made) [pli] | | | | |
| after 5 min | 20 | 20 | 20 | 20 |
| after 3 days | — | — | — | — |
| Creep resistance | good | — | good | good |
| Mature bond strength (leather/SBR) pli after 7 days | 14 | — | 40 | 25 |

*at speed of 0.5 inch/minute

Examples

| | 17 | 18 |
|---|---|---|
| Polyester A | 22.9% | 22.7% |
| Polyester B | 11.5% | 12.9% |
| Polyester C | 5.7% | 6.4% |
| Polyester D | 5.7% | 6.4% |
| Polypropylene gylcol | 22.9% | 19.3% |
| Tackifier | 5.7% | 6.4% |
| Hydrocarbon resin | — | — |
| MDI | 25.5% | 25.9 |
| NCO:OH | 1.5 | 1.5 |
| Viscosity [Pas] | | |
| 90° C. | — | — |
| 110° C. | 37 | — |
| 130° C. | 14 | 13 |
| 150° C. | — | — |
| 170° C. | — | — |
| Peel strength* (SBR/Man made) | | |

-continued

|  | 17 | 18 |
|---|---|---|
| [pli] | | |
| after 5 min | 11 | 22 |
| after 3 days | — | — |
| Creep resistance | — | — |
| Mature bond strength (leather/SBR) pli after 7 days | — | — |

*at speed of 0.5 inch/minute

Example 19

This example illustrates how the high green peel strength of the adhesive compositions of this invention is related to the polypropylene glycol content therein. The formulations evaluated are as follows.

| Material | A | B | C | D | E | F |
|---|---|---|---|---|---|---|
| PPG 425 | 9.2% | 16.0% | 19.6% | 25.4% | 35.5% | 57.1% |
| Polyester A | 73.8% | 63.9% | 58.8% | 50.8% | 35.5% | |
| MDI | 17.0% | 20.1% | 21.6% | 23.8% | 29.0% | 42.9% |
| NCO:OH ratio | 1.7:1 | 1.5:1 | 1.4:1 | 1.3:1 | 1.25:1 | 1.25:1 |
| viscosity, 130° C. (Pas) | 27 | 42 | 38 | 54 | 35 | 60 |
| Green strength @ 0.5 inch/min. | 1.6 pli | 2.5 pli | 6.5 pli | 10 pli | 17 pli | 15 pli |

In the above formulations, PPG 425 represents polypropylene glycol having an average molecular weight of 425; polyester A represents a partially crystalline polyester comprising a mixture of isophthalic acid, butanediol, phthalic acid dimethylester and adipic acid; and MDI represents a diphenylmethane 4,4'-diisocyanate. The NCO:OH ratio was calculated to provide a similar viscosity range to the compositions and make the results comparable, but not optimum. It can be seen from the green strength values obtained that the content of polypropylene glycol is very important. It is also illustrated by Example F that a satisfactory polyurethane hot-melt adhesive composition can be prepared based only on polypropylene glycol having an average molecular weight of 425 and the diisocyanate, i.e., in the absence of a polyester material.

Example 20

This example illustrates that the high green peel strength of the adhesive compositions of this invention can be obtained with different polyester types. The formulations evaluated are as follows.

| Material | A | B | C |
|---|---|---|---|
| PPG 425 | 200 g | 200 g | 200 g |
| Polyester A | 200 g | | |
| Polyester B | | 200 g | |
| Polyester E | | | 200 g |
| MDI | 171 g | 173 g | 172 g |
| NCO:OH ratio | 1.3:1 | 1.3:1 | 1.3:1 |
| viscosity, 130° C. (Pas) | 74 | 42 | 34 |
| green strength (pli) @ 5 inch/min. | 24 | 10 | 22 |

| Material | D | E | F |
|---|---|---|---|
| PPG 425 | 200 g | 200 g | 200 g |
| Polyester F | 200 g | | |
| Polyester G | | 200 g | |
| Polyester H | | | 200 g |
| MDI | 173 g | 170 g | 170 g |
| NCO:OH ratio | 1.3:1 | 1.4:1 | 1.4:1 |
| viscosity, 130° C. (Pas) | 18 | 125 | 185 |
| green strength (pli) @ 5 inch/min. | 4 | 25 | 45 |

In the above formulations, PPG 425 represents polypropylene glycol having an average molecular weight of 425. The polyester materials A, B, E, F, G and H are those described in the specification immediately preceding Example 1. MDI represents a diphenylmethane 4,4'-diisocyanate.

The green peel strength was determined using NBR/NBR sample strips being 1 inch wide and 5 inches long preheated to 80–100° C. The adhesive was applied on both strips at a temperature of about 180° C., and the strips were pressed together at about 100 psi for about 1 minute. It should be noted here that lower pressures for pressing the strips together may be used depending on the available equipment. The afore-mentioned NBR sample strips comprise a nitrile-rubber base having a Shore A hardness of 80, and is available from Prüf-Und-Forschungsinstitut Für Die Schuhherstellung, Pirmasens, Germany.

Example 21

This example illustrates preferred formulations for the adhesive compositions of this invention.

| Material | A | B | C | D | E |
|---|---|---|---|---|---|
| PPG 425 | 29.53% | 23.45% | 28.17% | 23.34% | 23.34% |
| Polyester A | 24.61% | 29.31% | 23.47% | 23.34% | 29.17% |
| Polyester B | 4.92% | 5.86% | 4.69% | 11.67% | 5.83% |
| Polyester I | 4.92% | 5.86% | 4.69% | 5.83% | 5.83% |
| Polyester C | 4.92% | 5.86% | 4.69 | 5.83% | 5.83% |
| Hydrocarbon resin | 4.92% | 5.86% | 9.38% | — | — |
| Tackifier | — | — | — | 5.83% | 5.83% |
| MDI | 26.18% | 23.80% | 24.91% | 24.16% | 24.15% |
| NCO:OH ratio | 1.3:1 | 1.4:1 | 1.3:1 | 1.4:1 | 1.4:1 |
| viscosity, 130° C. (Pas) | 45–60 | 27–32 | 85 | 27 | 43 |
| Green strength @ 5 inch/min. (pli) | 23–33 | 30 | 25 | 11 | 25 |

In the above formulations, PPG 425 represents polypropylene glycol having an average molecular weight of 425. The polyester materials A, B, C and I are those described in the specification immediately preceding Example 1. Tackifier represents a polymerized beta-pinene resin; and MDI represents a diphenylmethane 4,4'-diisocyanate. The green peel strength was determined as in Example 20 using NBR/NBR strips.

Example 22

This example illustrates that satisfactory hot-melt polyurethane adhesive compositions can also be prepared using high molecular weight polyesters. The content of polypropylene glycol is important herein.

| Material | A |
|---|---|
| PPG 425 | 34.4% |
| Polyester H | 34.4% |
| MDI | 31.2% |
| NCO:OH ratio | 1.4:1 |
| viscosity, 130° C., | 125 |
| 180° C. (Pas) | 20 |
| green strength (pli) @ 5 inch/min | 8–10 |

Example 23

This example illustrates a method of adhesively bonding a styrene-butadiene rubber sole to a leather shoe upper, and comprises the following steps. The adhesive composition A of Example 21 was melted and brought to a temperature of about 180° C. and applied as an adhesive coating layer to the attaching surface of the sole.

The sole was first coated with a conventional primer solution. The leather shoe upper was roughened by conventional means. The adhesive composition was applied to the sole pre-heated to 60–80° C. to form a layer of about 0.5 mm thick. The sole and shoe upper were pressed together in a shoe press machine at a gauge pressure of between 10–20 bar, and after about 5 minutes, pressed again under a pressure of between 10–20 bar. The green and the mature bond strength of the shoe assembly was considered satisfactory for use.

What is claimed is:

1. The method of bonding a sole to a shoe upper comprising the steps of providing on attaching surfaces of one or both of said sole and said shoe upper a layer of heat-softened adhesive composition comprising a moisture-curable polyurethane NCO-terminated prepolyer formed from about 20%/wt to about 65%/wt of a polyester polyol having a molecular weight of from about 1,500 to about 6,000, from about 10%/wt to about 70%/wt of a polypropylene glycol having a molecular weight of from about 250 to about 1,000, and from about 15%/wt to about 35%/wt of a diisocyanate, all weights being based on the weight of said composition, pressing the attaching surfaces of said sole and said shoe upper together with said adhesive composition between them, and cooling said adhesive composition to form an adhesive bond between said sole and said shoe upper.

2. A method according to claim 1 wherein said sole or said shoe upper is roughened, solvent wiped, halogenated or primed prior to application of said layer of said adhesive composition thereto.

3. A method according to claim 1 wherein said adhesive composition is applied as a solvent-free fluid at a temperature in the range from about 110° C. to about 180° C. to provide an adhesive layer on said sole or said shoe upper.

4. A method according to claim 1 wherein said adhesive composition further contains from about 3%/wt to about 15%/wt of an aromatic modified hydrocarbon resin or terpene hydrocarbon resin, based on the weight of said composition.

5. A method according to claim 1 wherein said polyester polyol is present in an amount of from about 35%/wt to about 50%/wt, said polypropylene glycol is present in an amount of from about 15%/wt to about 35%/wt, and said diisocyanate is present in an amount of from about 15%/wt to about 35%/wt, all weights being based on the weight of said composition.

6. A method according to claim 1 wherein said polyester polyol is the reaction product of a mixture selected from the group consisting of (1) a mixture of isophthalic acid, butanediol, phthalic acid dimethylester and adipic acid; (2) a mixture of phthalic acid dimethylester, adipic acid and hexanediol; (3) a mixture of isophthalic acid, neopentyl glycol, ethylene glycol, adipic acid, phthalic acid and 3-hydroxy-2,2-dimethyl-propyl-3-hydroxy-2,2-dimethyl propanoate; and (4) a mixture of neopentyl glycol, ethylene glycol, adipic acid and phthalic acid anhydride.

7. A method according to claim 1 wherein said diisocyanate is selected from the group consisting of toluene diisocyanates, diphenyl methane diisocyanates, and mixtures thereof.

8. A method according to claim 1 wherein said polyurethane NCO-terminated prepolymer comprises a prepolymer having a ratio of reactive NCO groups to reactive OH groups of from about 1.1:1 to about 1.7:1.

9. A method according to claim 1 wherein said polyurethane NCO-terminated prepolymer before curing has an average molecular weight of from about 3,500 to about 10,000.

10. A method according to claim 1 wherein said polyester polyol has a crystalline melting point of from about 40° C. to about 70° C.

11. A method according to claim 1 wherein said polyester polyol has a hydroxyl number of from about 27 to about 60, a glass transition temperature of from about −40° C. to about 30° C., and a viscosity at 130° C. of from 3,000 mPas to about 30,000 mpas.

12. An article of footwear having a sole portion and an upper portion prepared by adhesively bonding together said sole portion and said upper portion comprising the steps of providing on the attaching surface of one or both of said sole portion and said upper portion a layer of heat-softened adhesive composition comprising a moisture-curable polyurethane NCO-terminated prepolymer formed from about 20%/wt to about 65%/wt of a polyester polyol having a molecular weight of from about 1,500 to about 6,000, from about 10%/wt to about 70%/wt of a polypropylene glycol having a molecular weight of from about 250 to about 1,000, and from about 15%/wt to about 35%/wt of a diisocyanate, all weights being based on the weight of said composition, pressing together the attaching surfaces of said sole portion and said upper portion with said adhesive composition between them, and cooling said adhesive composition to form an adhesive bond between said sole portion and said upper portion.

13. An article as in claim 12 wherein said adhesive composition further contains from about 3%/wt to about 15%/wt of an aromatic modified hydrocarbon resin or terpene hydrocarbon resin, based on the weight of said adhesive composition.

14. An article as in claim 12 wherein said polyester polyol is the reaction product of a mixture selected from the group consisting of (1) a mixture of isophthalic acid, butanediol, phthalic acid dimethylester and adipic acid; (2) a mixture of phthalic acid dimethylester, adipic acid and hexanediol; (3) a mixture of isophthalic acid, neopentyl glycol, ethylene glycol, adipic acid, phthalic acid and 3-hydroxy-2,2-dimethyl-propyl-3-hydroxy-2,2-dimethyl propanoate; and (4) a mixture of neopentyl glycol, ethylene glycol, adipic acid, and phthalic acid anhydride.

15. An article as in claim 12 wherein said diisocyanate is selected from the group consisting of toluene diisocyanates, diphenyl methane diisocyanates, and mixtures thereof.

16. An article as in claim 12 wherein said polyurethane NCO-terminated prepolymer comprises a prepolymer having a ratio of reactive NCO groups to reactive OH groups of from about 1.1:1 to about 1.7:1.

17. An article as in claim 12 wherein said polyurethane NCO-terminated prepolymer before curing has an average molecular weight of from about 3,500 to about 10,000.

18. An article as in claim 12 wherein said polyester polyol has a crystalline melting point of from about 40° C. to about 70° C.

19. An article as in claim 12 wherein said polyester polyol has a hydroxyl number of from about 27 to about 60, a glass transition temperature of from about −40° C. to about +30° C., and a viscosity at 130° C. of from about 3,000 mPas to about 30,000 mpas.

20. An article as in claim 12 wherein one or both of said sole portion and said upper portion is roughened, solvent-wiped, halogenated or primed prior to application of said layer of said adhesive composition thereto.

* * * * *